Nov. 11, 1958  C. SHELTON, JR  2,859,573
MACHINE FOR FORMING AND HANDLING MARGARINE AND THE LIKE
Filed Jan. 20, 1955  6 Sheets-Sheet 1
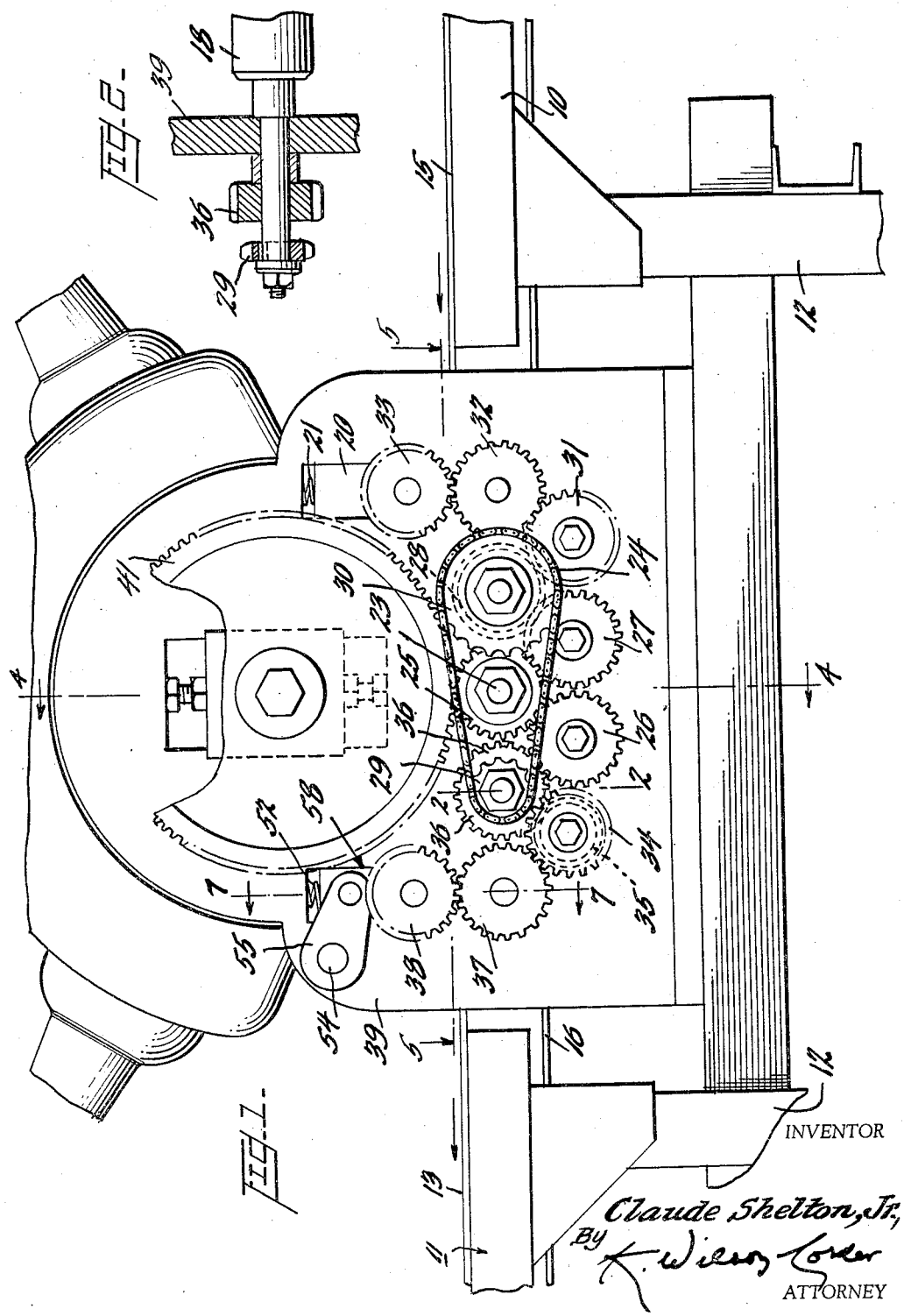
INVENTOR
Claude Shelton, Jr.,
BY
ATTORNEY

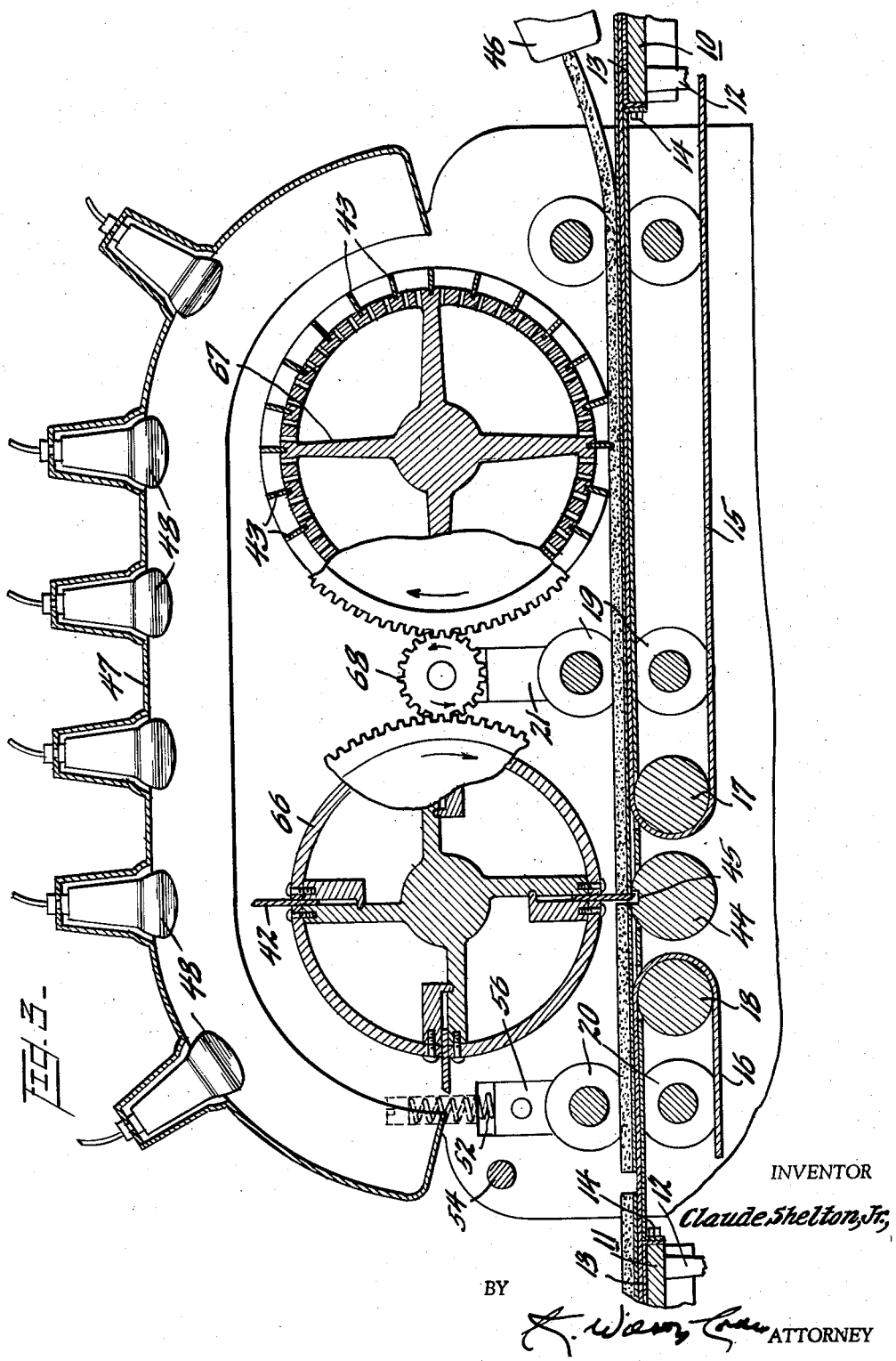

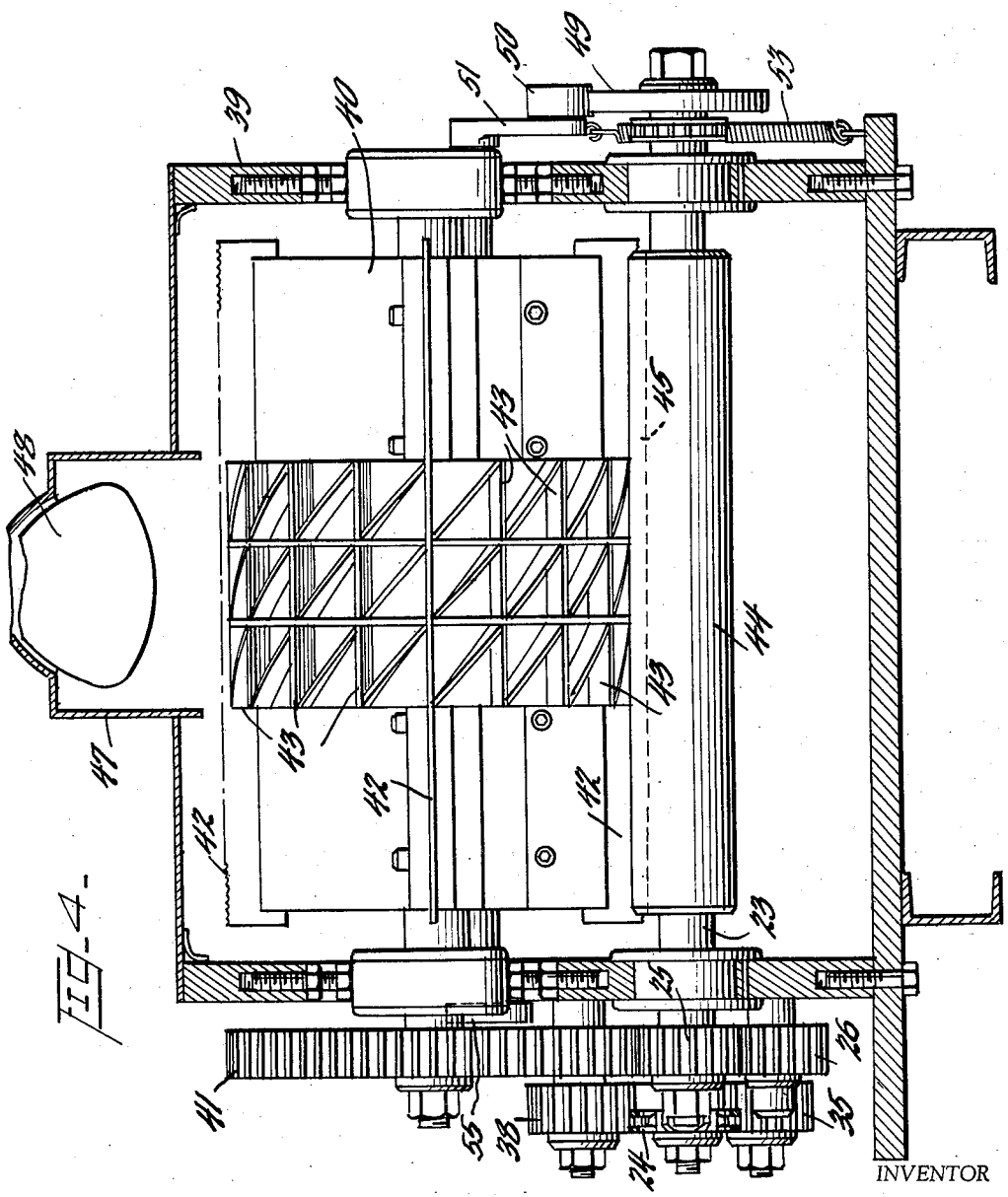

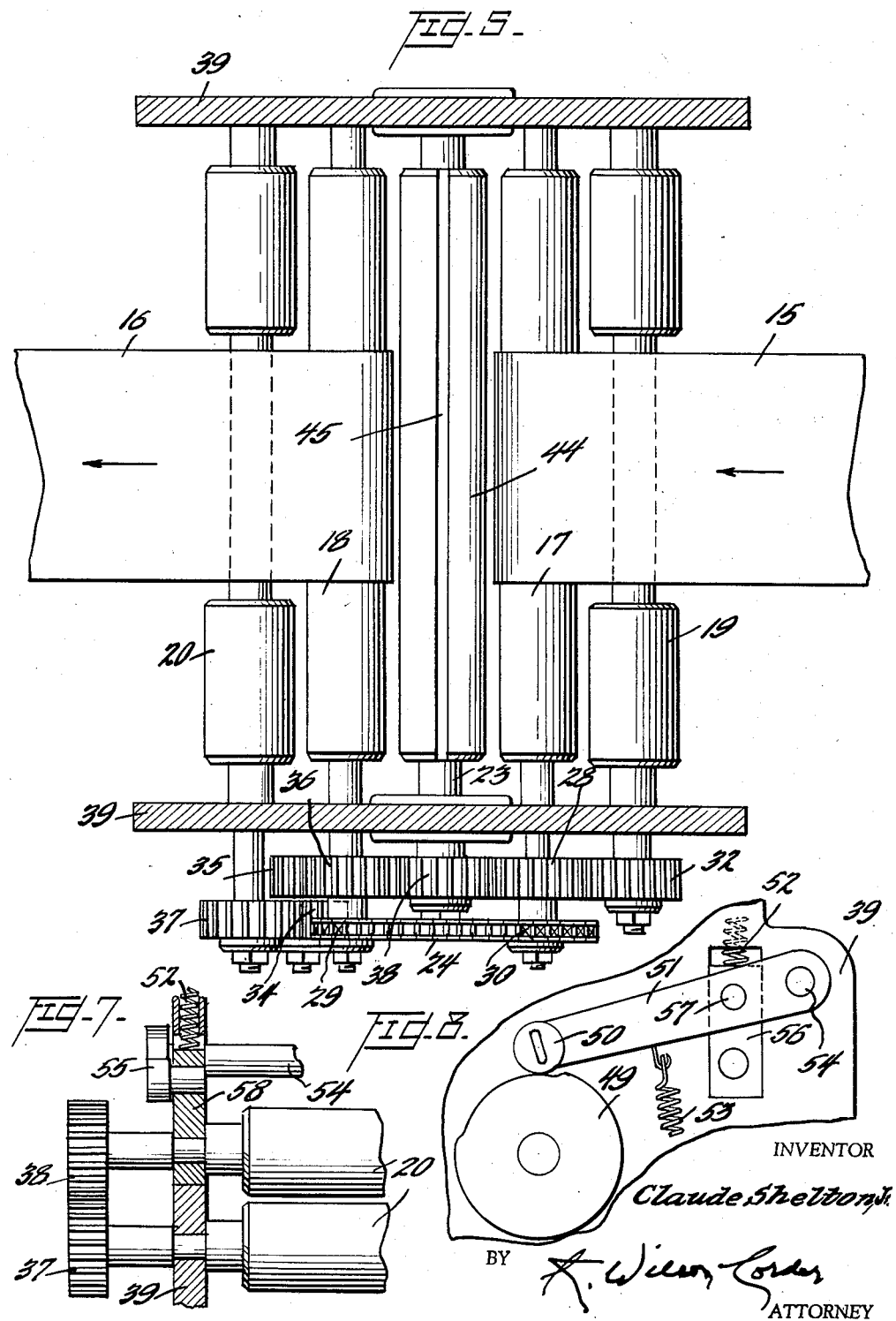

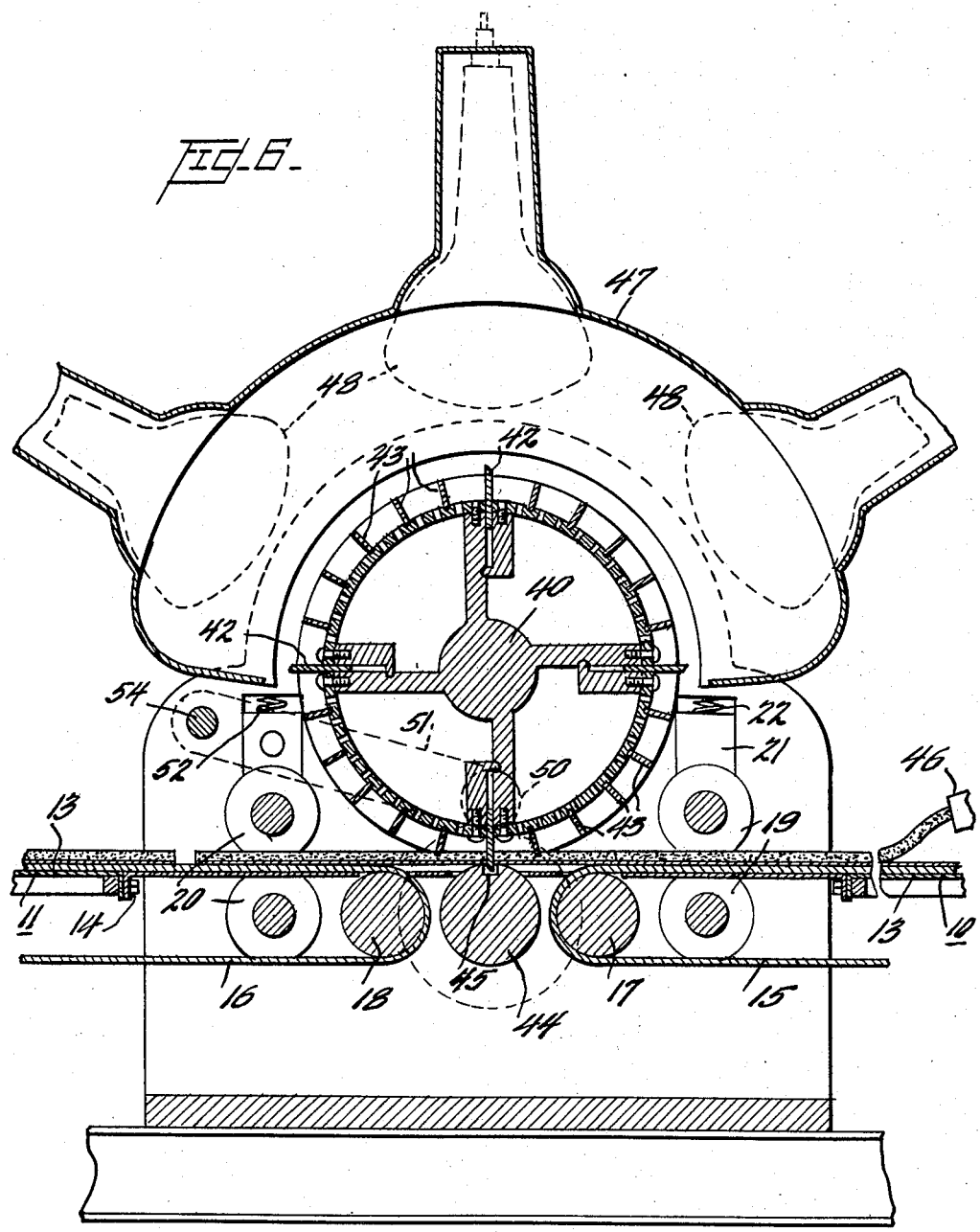

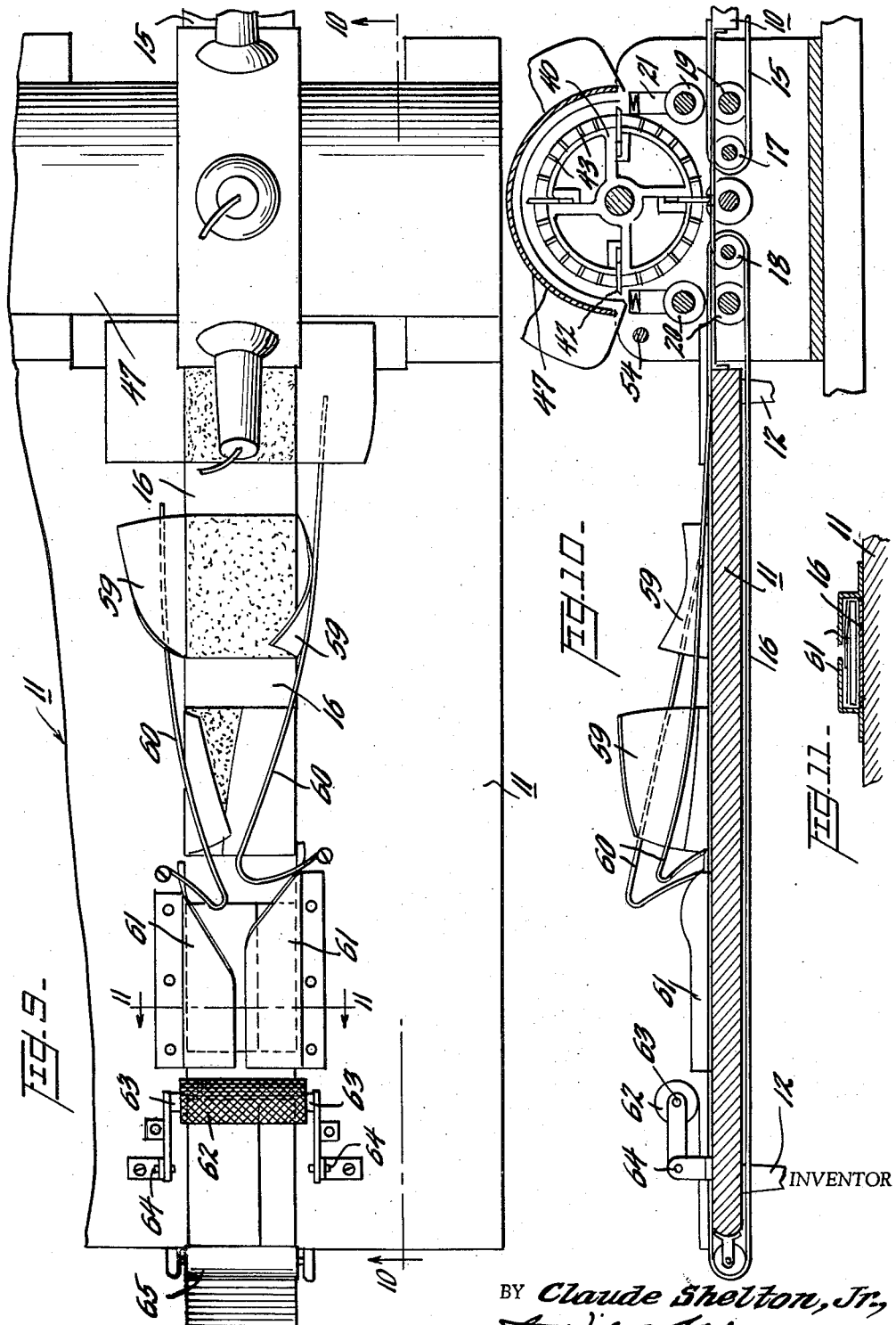

United States Patent Office 2,859,573
Patented Nov. 11, 1958

2,859,573

MACHINE FOR FORMING AND HANDLING MARGARINE AND THE LIKE

Claude Shelton, Jr., Atlanta, Ga., assignor to The Mar-Gold Corporation, Atlanta, Ga., a corporation of Georgia Application January 20, 1955, Serial No. 483,073

16 Claims. (Cl. 53—123)

This invention relates to the food industry and more particularly to food machinery used in the molding and handling of substances such as margarine or butter, or materials having a similar consistency; into slabs of predetermined length, width and thickness, each slab ultimately being made up of smaller units of predetermined size and shape.

Heretofore, machines to accomplish this purpose have been suggested, but such are for the most part expensive and complicated, and do not function entirely satisfactorily.

An object of this invention is to provide a machine which places margarine or the like on a strip of paper or other suitable wrapping material, and periodically cuts the paper and the material thereon to a desired length.

Another object is to provide such a machine which cuts a strip of margarine or the like into smaller units of desired size and shape.

Another object is to provide means for wrapping such a slab preparatory to placing such in a packing case.

A still further object is to provide simplicity of operation and economy of manufacture in such a device.

Another object is to provide a minimum of moving parts in such a structure.

Another object is to provide ready accessibility to all working parts of such a machine.

These and other objects made apparent during the further progress of this specification are accomplished by means of my new and improved margarine or butter handling and forming machine, a full and complete understanding of which is facilitated by reference to the drawings herein, in which:

Fig. 1 is a side view of the device;

Fig. 2 is an enlarged vertical sectional view, taken along the line 2—2 of Fig. 1;

Fig. 3 is a side view of an alternate form of my invention in which separate margarine forming, and paper cutting wheels are employed;

Fig. 4 is an end view of the structure shown in Fig. 1, taken from the entering or feeding end of the device;

Fig. 5 is a top view of the structure illustrated by Fig. 1;

Fig. 6 is a longitudinal vertical sectional view illustrating particularly the cutting and forming wheel;

Fig. 7 is an enlarged vertical sectional view taken substantially along the line 7—7 of Fig. 1;

Fig. 8 is an enlarged detail of a certain cam arrangement in subject device, said view being taken from the side;

Fig. 9 is a top plan view showing the paper folding arrangement at the discharge end of the instant device;

Fig. 10 is a side view of the structure shown in Fig. 9; and

Fig. 11 is an enlarged vertical sectional view taken along the line 3—3 of Fig. 9, looking in the direction of the arrows.

Referring now to the drawings, Figs. 1 and 6, it will be seen that my device comprises a pair of tables 10 and 11 having supporting legs 12 and stainless steel tops 13, said tables being suitably joined together as at 14 (Fig. 6) to form a continuous smooth surface in conjunction with a pair of conveyor belts 15 and 16 (Fig. 5), which operate upon an incoming conveyor drive roll 17 and outgoing conveyor drive roll 18, in conjunction with wrapping material pinch feed rolls 19 and tension rolls 20. Constant pressure is maintained on the pinch feed rolls through bearing block 21 acting against spring 22 (Fig. 6). In some installations it has been found practicable to eliminate conveyor belt 15, the paper being drawn through the pinch feed rolls then serving to perform this function.

A main drive shaft 23 (Fig. 1) is driven by a source of power (not shown), and in conjunction with chain 24 drives, inter alia, rolls 17 and 18 through the agency of gears 25, 26, 27 and 28.

In this connection, gear 25 drives 27, 28, sprockets 29 and 30, and gears 31, 32 and 33. Gears 27 and 31 are idlers to secure correct rotation of associated parts, and gear 28 is keyed to conveyor roll 17 and thence to pinch feed rolls 19.

In order to apply proper tension to the paper being fed through the machine, the outgoing conveyor drive roll is driven at a higher speed than the incoming conveyor drive roll, this being accomplished by making sprocket 29 of somewhat smaller diameter than sprocket 30 on gear 28. Tension rolls 20 are driven by gears 34, 35, 36, 37 and 38. Said elements are mounted on a supporting framework 39 through conventional shafts and bearings.

To re-state the foregoing: Gear 25 drives 26, 36, 35 and 34, 37, 38 in sequence, 34 and 35 being one common gear, and 35 having fewer teeth than 36, which is loose on its operating shaft, through which is made possible a higher speed for pinch rolls 20 than is the case of rolls 19. All gears mentioned thus far, with the exception of 35, have the same number of teeth. The discharge conveyor roll is driven off of gear 28 through sprockets 30 and 29.

Special attention is now directed to cutting roll 40, which is mounted in supporting framework 39 in such a manner as to rotate when driven by shaft 23 cooperating with gear 41, the ratio as shown in the drawings being of the order of 4 to 1. Mounted at spaced intervals around the peripheral edge of cutting roll 40 is a series of cutting blades 42, and likewise associated with said edge is a plurality of margarine scoring segments 43 which may be arranged to form any suitable pattern, size or shape of the material being processed.

Roll 40 cooperates with a billy roll 44 having a longitudinally extending indentation 45 therein.

An extruding die 46 is positioned to the right or incoming side of the machine, and a hood 47 having a plurality of sockets for heat-generating bulbs 48 is positioned over the device adjacent cutter wheel 40.

The operation of my machine is as follows: Margarine, butter or a substance of similar consistency is reduced to solid form at a remote point, and transmitted to die 46 where it is extruded into a ribbon of desired width and thickness onto suitable paper fed through rolls 19. Paper pinch rolls 19 control the speed of the paper so that it enters the machine at a speed synchronized with that of the material being extruded, which material enters at the right and passes over billy roll 44, and into contact with the scoring and paper cutting roll 40. The scoring blades 43 on the roll form the material into the desired shapes, and at the proper instant, blades 42 cut the material being processed, as well as the wrapping paper, to the desired pre-determined length. As stated heretofore, paper pinch rolls 20 are internally timed and turn at a higher rate of speed than paper feed rolls 19, for the purpose of applying the proper tension to the paper so that when the knives pass into the slot 45 of billy roll 44, the wrapping material will be cut. Concurrent with this operation, supplemental tension is applied to the paper by means of cam 49 operating in conjunction with follower 50 (Fig. 8) and pivoted arm 51 which is counter-balanced by springs 52 and 53, this action serving to momentarily force rolls 20 together and by thus tensioning the paper, provide a better cutting condition at the exact time that this becomes desirable.

The paper pinch rolls 20 are not in contact with the wrapping material except during the instant the paper is being cut. This contact period is controlled by cam 49 and pivoted arm 51, the latter being pivoted on shaft 54 (Fig. 8). This shaft passes through to the other side of the device and operates arm 55 (Fig. 1). When cam follower 50 is in the position as shown by Fig. 8, tension has just been applied to the wrapping material. When arm 51 falls it allows pinch roll bearing block 56 to drop under pressure of spring 52. A pin 57 raises and lowers 56 through cam 49 and arm 51. Arm 55 on the opposite side and fastened to the same shaft as arm 51 operates in exactly the same manner and raises and lowers bearing block 58.

The material being processed is now discharged onto conveyor 16 and side extensions 59 (Figs. 9 and 10) of the wrapping paper are brought into contact with converging guide wire members 60 and plates 61, with the result that said flaps are brought across the margarine or other material, to lie flat thereon, this folding operation being supplemented by a roller 62 pivoted as at 63 and 64, the material being processed passing under said roller and the bare weight thereof tending to slightly crease the paper so that it remains in a protective position as the material emerges at point 65, where it is ejected into conventional shipping boxes.

Fig. 3 shows a modification of the instant device in which a separate cutting wheel 66 is employed to cut the paper after the margarine has been formed by elements 43 in a manner described heretofore, said wheel driving a forming wheel 67 through intermediate gear 68, the operation otherwise being the same. Some advantages arise from thus separating the forming and cutting functions of the wheel, although very satisfactory results have been attained from the machine as described herein.

From the foregoing, it is apparent that I have disclosed and described a new and improved margarine or butter forming and handling machine that is simple in operation, economical to manufacture, and thoroughly suited for its intended uses. While I have described in some detail a preferred form of my device, it is apparent that certain changes, alterations, reconstructions and the like may be resorted to without departing from the scope of the appended claims, which are to be given an interpretation fairly in keeping with my contribution to the art.

I claim:

1. In a device of the character described, a support, an incoming conveyor drive roll mounted thereon, an outgoing conveyor drive roll likewise so mounted, a pair of conveyor belts operatively positioned on said rolls, a pair of wrapping material pinch feed rolls mounted on said support in oppositely disposed relationship, a pair of oppositely disposed tension rolls mounted on said support at a point beyond said feed rolls, a cutting roll operatively mounted between said feed rolls and tension rolls, a plurality of cutting blades disposed around the outer peripheral surface of said cutting roll at spaced intervals and parallel to the axis thereof, a plurality of scoring elements disposed around the central peripheral surface of said cutting roll, a billy roll disposed beneath said cutting roll, a longitudinally extending indentation in said billy roll cooperating with the cutting blades of the cutting roll, and means for driving all of said rolls in synchronized relationship whereby a substance carried by the conveyor of the incoming drive roll is scored by the outer segments of the cutting roll, and paper upon which said substance has been deposited, periodically severed by the blades of said roll, tension being concurrently applied to the paper through said tension rolls with each cutting operation.

2. In a device of the character described, a support, an incoming conveyor drive roll mounted thereon, an outgoing conveyor drive roll likewise so mounted, a pair of conveyor belts operatively positioned on said rolls, a pair of wrapping material pinch feed rolls mounted on said support in oppositely disposed relationship, a pair of oppositely disposed tension rolls mounted on said support at a point beyond said feed rolls, means for driving said tension rolls at a faster speed than said pinch feed rolls, a cutting roll operatively mounted between said feed rolls and tension rolls, a plurality of cutting blades disposed around the outer peripheral surface of said cutting roll at spaced intervals and parallel to the axis thereof, a plurality of scoring elements disposed around the central peripheral surface of said cutting roll, a billy roll disposed beneath said cutting roll, a longitudinally extending indentation in said billy roll cooperating with the cutting blades of the cutting roll, and means for driving all of said rolls in synchronized relationship whereby a substance carried by the conveyor of the incoming drive roll is scored by the outer segments of the cutting roll, and paper upon which said substance has been deposited, periodically severed by the blades of said roll, tension being concurrently applied to the paper through said tension rolls with each cutting operation.

3. In a device of the character described, a support, an incoming conveyor drive roll mounted thereon, an outgoing conveyor drive roll likewise so mounted, a pair of conveyor belts operatively positioned on said rolls, a pair of wrapping material pinch feed rolls mounted on said support in oppositely disposed relationship, a pair of oppositely disposed tension rolls mounted on said support at a point beyond said feed rolls, means for driving said tension rolls at a faster speed than said pinch feed rolls, a cutting roll operatively mounted between said feed rolls and tension rolls, a plurality of cutting blades disposed around the outer peripheral surface of said cutting roll at spaced intervals and parallel to the axis thereof, a plurality of scoring elements disposed around the central peripheral surface of said cutting roll, a billy roll disposed beneath said cutting roll, a longitudinally extending indentation in said billy roll cooperating with the cutting blades of the cutting roll, and gear, sprocket and chain means for driving all of said rolls in synchronized relationship whereby a substance carried by the conveyor of the incoming drive roll is scored by the outer segments of the cutting roll, and paper upon which said substance has been deposited, periodically severed by the blades of said roll, tension being concurrently applied to the paper through said tension rolls with each cutting operation.

4. In a device of the character described, a support, an incoming conveyor drive roll mounted thereon, an outgoing conveyor drive roll likewise so mounted, a pair of conveyor belts operatively positioned on said rolls, a plurality of wrapping material pinch feed rolls mounted on said support in oppositely disposed relationship, a plurality of oppositely disposed tension rolls mounted on said support at a point beyond said feed rolls, a cutting roll operatively mounted between said feed rolls and tension rolls, a plurality of cutting blades disposed at spaced intervals around the outer peripheral surface of said cutting roll, a plurality of scoring elements disposed around the peripheral surface of said cutting roll, a billy roll disposed beneath said cutting roll, a longitudinally extending indentation in said billy roll cooperating with the cutting blades of the cutting roll, and means for driving all of said rolls in synchronized relationship whereby a substance carried by the conveyor of the incoming drive roll is scored by the outer segments of the cutting roll, and paper upon which said substance has been deposited, periodically severed by the blades of said roll, tension being concurrently applied to the paper through said tension rolls with each cutting operation.

5. In a device of the character described, a support, an incoming conveyor drive roll mounted thereon, an outgoing conveyor drive roll likewise so mounted, a conveyor belt operatively positioned on said outgoing roll, a plurality of wrapping material pinch feed rolls mounted on said support in oppositely disposed relationship, a plurality of oppositely disposed tension rolls mounted on said support at a point beyond said feed rolls, a cutting roll operatively mounted between said feed rolls and tension rolls, a plurality of cutting blades disposed at spaced intervals around the outer peripheral surface of said cutting roll, a plurality of scoring elements disposed around the peripheral surface of said cutting roll, a billy roll disposed beneath said cutting roll, a longitudinally extending indentation in said billy roll cooperating with the cutting blades of the cutting roll, and means for driving all of said rolls in synchronized relationship whereby a substance spread upon paper carried by the incoming drive roll is scored by the outer segments of the cutting roll, and the paper periodically severed by the blades of said roll, tension being concurrently applied to the paper through said tension rolls with each cutting operation.

6. In a device of the character described, a support, an incoming conveyor drive roll mounted thereon, an outgoing conveyor drive roll likewise so mounted, a conveyor belt drive roll likewise so mounted, a conveyor belt operatively positioned on said outgoing roll, a plurality of wrapping material pinch feed rolls mounted on said support in oppositely disposed relationship, a plurality of oppositely disposed tension rolls mounted on said support at a point beyond said feed rolls, a cutting roll operatively mounted between said feed rolls and tension rolls, a plurality of cutting blades disposed at spaced intervals around the outer peripheral surface of said cutting roll, a plurality of scoring elements disposed around the peripheral surface of said cutting roll, a billy roll disposed beneath said cutting roll cooperating with the cutting blades thereof, and means for driving all of said rolls in synchronized relationship whereby a substance spread upon paper carried by the incoming drive roll is scored by the outer segments of the cutting roll, and the paper periodically severed by the blades of said roll, tension being concurrently applied to the paper through said tension rolls with each cutting operation.

7. In a device of the character described, a support, an incoming conveyor drive roll mounted thereon, an outgoing conveyor drive roll likewise so mounted, conveyor belts operatively positioned on said rolls, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a cutting roll operatively mounted at a point between said feed rolls and tension rolls, a plurality of cutting blades disposed around the outer peripheral surface of said cutting roll at spaced intervals and parallel to the axis thereof, a plurality of scoring elements disposed around the peripheral surface of said cutting roll, a billy roll disposed beneath said cutting roll, said billy roll cooperating with the cutting blades of the cutting roll, and means for driving all of said rolls in synchronized relationship whereby a substance placed upon a continuous strip of material carried by the conveyor of the incoming drive roll is scored by the outer segments of the cutting roll, and the material upon which said substance has been deposited, periodically severed by the blades of said roll, and tension concurrently applied to said material through the tension rolls with each cutting operation.

8. In a device of the character described, a support, an incoming conveyor drive roll mounted thereon, an outgoing conveyor drive roll likewise so mounted, conveyor belts operatively positioned on said rolls, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a scoring roll mounted at a point between said feed rolls and tension rolls, a plurality of scoring elements disposed around the peripheral edge of said roll, a cutting roll operatively mounted at a point between said scoring roll and said tension rolls and driving the former, a plurality of cutting blades disposed around the outer peripheral surface of said cutting roll at spaced intervals and parallel to the axis thereof, a billy roll disposed beneath said cutting roll, said billy roll cooperating with the cutting blades of the cutting roll, and means for driving all of said rolls in synchronized relationship whereby a substance placed upon a continuous strip of material carried by the conveyor of the incoming drive roll is scored by the outer segments of the cutting roll, and the material upon which said substance has been deposited, periodically severed by the blades of the cutting roll, and tension concurrently applied to said material through the tension rolls with each cutting operation.

9. In a device of the character described, a support, an incoming conveyor drive roll mounted thereon, an outgoing conveyor drive roll likewise so mounted, conveyor belts operatively positioned on said rolls, a plurality of wrapping material pinch feed rolls mounted on said support in oppositely disposed relationship, a plurality of oppositely disposed tension rolls mounted on said support at a point beyond said feed rolls, a cutting roll operatively mounted at a point between said feed rolls and tension rolls, a plurality of cutting blades disposed around the outer peripheral surface of said cutting roll at spaced intervals and parallel to the longitudinal axis thereof, a plurality of scoring elements disposed around the peripheral surface of said cutting roll, a billy roll disposed beneath said cutting roll, said billy roll cooperating with the cutting blades of the cutting roll, and means for driving all of said rolls in synchronized relationship whereby a substance placed upon a continuous strip of material carried by the conveyor of the incoming drive roll is scored by the outer segments of the cutting roll, and the material upon which said substance has been deposited, periodically severed by the blades of said roll, and tension concurrently applied to said material through the tension rolls during each cutting operation.

10. In a device of the character described, a support, an incoming conveyor roll mounted thereon, an outgoing conveyor drive roll likewise so mounted, a conveyor belt operatively positioned on said second roll, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a cutting roll operatively mounted between said feed rolls and tension rolls, a plurality of cutting blades disposed around the outer peripheral surface of said cutting roll at spaced intervals, a plurality of scoring elements disposed around the peripheral surface of said cutting roll, a billy roll disposed beneath said cutting roll, a longitudinally extending indentation in said billy roll cooperating with the cutting blades of the cutting roll, a hood disposed above said cutting roll, heating means anchored in said hood, and means for driving all of said rolls in synchronized relationship whereby a substance distributed upon a strip of wrapping material carried by the incoming drive roll is scored by the outer segments of the cutting roll, and the material upon which said substance has been deposited, periodically severed by the blades of said roll, tension being concurrently applied to said material through said tension rolls with each cutting operation.

11. In a device of the character described, a support, an incoming conveyor roll mounted thereon, an outgoing conveyor drive roll likewise so mounted, a conveyor belt operatively positioned on said second roll, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a cutting roll operatively mounted between said feed rolls and tension rolls, a plurality of cutting blades disposed around the outer peripheral surface of said cutting roll at spaced intervals, a plurality of scoring elements disposed around the peripheral surface of said cutting roll, a billy roll disposed beneath said cutting roll, a longitudinally extending indentation in said billy roll cooperating with the cutting blades of the cutting roll, a shield disposed above said cutting and scoring roll, heating means secured to the inner side of said shield, and means for driving all of said rolls in synchronized relationship whereby a substance distributed upon a strip of wrapping material carried by the incoming drive roll is scored by the outer segments of the cutting roll, and the material upon which said substance has been deposited, periodically severed by the blades of said roll, tension being concurrently applied to said material through said tension rolls with each cutting operation.

12. In a device of the character described, a support, an incoming conveyor roll mounted thereon, an outgoing conveyor drive roll likewise so mounted, a conveyor belt operatively positioned on said second roll, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a cutting roll operatively mounted between said feed rolls and tension rolls, a plurality of cutting blades disposed around the outer peripheral surface of said cutting roll at spaced intervals, a plurality of scoring elements disposed around the peripheral surface of said cutting roll, a billy roll disposed beneath said cutting roll, a longitudinally extending indentation in said billy roll cooperating with the cutting blades of the cutting roll, a hood disposed above said cutting roll and anchored to said support, electric heating means positioned in said hood, and means for driving all of said rolls in synchronized relationship whereby a substance distributed upon a strip of wrapping material carried by the incoming drive roll is scored by the outer segments of the cutting roll, and the material upon which said substance has been deposited, periodically severed by the blades of said roll, tension being concurrently applied to said material through said tension rolls with each cutting operation.

13. In a device of the character described, a support, an incoming conveyor drive roll mounted thereon, an outgoing conveyor drive roll likewise so mounted, conveyor belts operatively positioned on said rolls, a plurality of wrapping material contacting pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a scoring roll mounted at a point between said feed rolls and tension rolls, a plurality of scoring elements disposed around the peripheral edge of said roll, a cutting roll operatively mounted at a point between said scoring roll and said tension rolls and driving the former, a plurality of cutting blades disposed around the outer peripheral surface of said cutting roll at spaced intervals and parallel to the axis thereof, a billy roll disposed beneath said cutting roll, and means for driving all of said rolls in synchronized relationship whereby a substance placed upon a continuous strip of material carried by the conveyor of the incoming drive roll is scored by the outer segments of the cutting roll, and the material upon which said substance has been deposited, periodically severed by the blades of the cutting roll, and tension concurrently applied to said material through the tension rolls during each cutting operation.

14. In a device of the character described, a support, an incoming conveyor drive roll mounted thereon, an outgoing conveyor drive roll likewise so mounted, conveyor belts operatively positioned on said rolls, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a cutting roll operatively mounted at a point between said feed rolls and tension rolls, a plurality of cutting blades disposed around the outer peripheral surface of said cutting roll at spaced intervals and parallel to the axis thereof, a plurality of scoring elements disposed around the peripheral surface of said cutting roll, a billy roll disposed beneath said cutting roll, means for driving all of said rolls in synchronized relationship whereby a substance placed upon a continuous strip of material carried by the conveyor of the incoming drive roll is scored by the outer segments of the cutting roll, and the material upon which said substance has been deposited, periodically severed by the blades of said roll, tension being concurrently applied to said material through the tension rolls with each cutting operation; and means for folding opposite edges of said wrapping material over the substance being processed, at a point beyond that at which said cutting occurs.

15. In a device of the character described, a support, an incoming conveyor drive roll mounted thereon, an outgoing conveyor drive roll likewise so mounted, conveyor belts operatively positioned on said rolls, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a cutting roll operatively mounted at a point between said feed rolls and tension rolls, a plurality of cutting blades disposed around the outer peripheral surface of said cutting roll at spaced intervals and parallel to the axis thereof, a plurality of scoring elements disposed around the peripheral surface of said cutting roll, a billy roll disposed beneath said cutting roll, means for driving all of said rolls in synchronized relationship whereby a substance placed upon a continuous strip of material carried by the conveyor of the incoming drive roll is scored by the outer segments of the cutting roll, and the material upon which said substance has been deposited, periodically severed by the blades of said roll, tension being concurrently applied to said material through the tension rolls with each cutting operation; and means for folding opposite edges of said wrapping material over the substance being processed, at a point beyond that at which said cutting occurs, said means including a plurality of converging guide members anchored to the support on opposite sides of the outgoing conveyor belt.

16. In a device of the character described, a support, an incoming conveyor drive roll mounted thereon, an outgoing conveyor drive roll likewise so mounted, conveyor belts operatively positioned on said rolls, a plurality of wrapping material pinch feed rolls mounted on said support in oppositely disposed relationship, a plurality of oppositely disposed tension rolls mounted on said support at a point beyond said feed rolls, means for driving said tension rolls at a faster speed than said pinch feed rolls, a cutting roll operatively mounted at a point between said feed rolls and tension rolls, a plurality of cutting blades disposed around the outer peripheral surface of said cutting roll at spaced intervals and parallel to the axis thereof, a plurality of scoring elements disposed around the peripheral surface of said cutting roll, a billy roll disposed beneath said cutting roll, means for driving all of said rolls in synchronized relationship whereby a substance placed upon a continuous strip of material carried by the conveyor of the incoming drive roll is scored by the outer segments of the cutting roll, and the material upon which said substance has been deposited, periodically severed by the blades of said roll, tension being concurrently applied to said material through the tension rolls with each cutting operation; and means for folding opposite edges of said wrapping material over the substance being processed, at a point beyond that at which said cutting occurs, said means including a plurality of converging guide members anchored to the support on opposite sides of the outgoing conveyor belt, one of said guides being slightly higher than its oppositely disposed companion, a pair of flat plates fastened to the support and lying on a uniform plane above said belt, and a pivoted roller extending across the belt and contacting said wrapped substance in a final, material creasing action before packing or other disposition thereof.

References Cited in the file of this patent

UNITED STATES PATENTS

| | | |
|---|---|---|
| 1,810,740 | Vogt | June 16, 1931 |
| 2,142,468 | White | Jan. 3, 1939 |
| 2,303,351 | Gage | Dec. 1, 1942 |